(12) United States Patent
Daubenspeck et al.

(10) Patent No.: US 8,298,929 B2
(45) Date of Patent: Oct. 30, 2012

(54) OFFSET SOLDER VIAS, METHODS OF MANUFACTURING AND DESIGN STRUCTURES

(75) Inventors: Timothy H. Daubenspeck, Colchester, VT (US); Gary Lafontant, Elmont, NY (US); Ekta Misra, Fishkill, NY (US); David L. Questad, Hopewell Junction, NY (US); George J. Scott, Wappingers Falls, NY (US); Krystyna W. Semkow, Poughquag, NY (US); Timothy D. Sullivan, Underhill, VT (US); Thomas A. Wassick, LaGrangeville, NY (US); Steven L. Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 12/960,110

(22) Filed: Dec. 3, 2010

(65) Prior Publication Data

US 2012/0139123 A1    Jun. 7, 2012

(51) Int. Cl.
*H01L 21/44*    (2006.01)
*H01L 21/4763*   (2006.01)

(52) U.S. Cl. .................. 438/612; 438/613; 438/637

(58) Field of Classification Search .................. 438/612, 438/613, 637
See application file for complete search history.

(56) References Cited

U.S. PATENT DOCUMENTS

| | | | |
|---|---|---|---|
| 6,016,013 A | 1/2000 | Baba | |
| 6,492,198 B2 | 12/2002 | Hwang | |
| 6,833,615 B2 * | 12/2004 | Geng et al. | 257/698 |
| 7,812,438 B2 * | 10/2010 | Jadhav et al. | 257/698 |
| 2005/0128721 A1 * | 6/2005 | Tay et al. | 361/777 |
| 2006/0076679 A1 | 4/2006 | Batchelor et al. | |
| 2006/0264021 A1 | 11/2006 | Farahani et al. | |
| 2007/0023925 A1 * | 2/2007 | Ke et al. | 257/779 |
| 2009/0174084 A1 | 7/2009 | Jadhav et al. | |
| 2009/0278263 A1 | 11/2009 | McCarthy et al. | |

OTHER PUBLICATIONS

Daubenspeck, T. et al., "Chip-Level Final Via Design for PbFree Packaging CPI", IBM Corporation, May 11, 2010, 22 pages.

* cited by examiner

*Primary Examiner* — Luan C Thai
(74) *Attorney, Agent, or Firm* — David Cain; Roberts Mlotkowski Safran & Cole, P.C.

(57) ABSTRACT

Semiconductor structures, methods of manufacture and design structures are provided. The structure includes at least one offset crescent shaped solder via formed in contact with an underlying metal pad of a chip. The at least one offset crescent shaped via is offset with respect to at least one of the underlying metal pad and an underlying metal layer in direct electrical contact with an interconnect of the chip which is in electrical contact with the underlying metal layer.

6 Claims, 8 Drawing Sheets

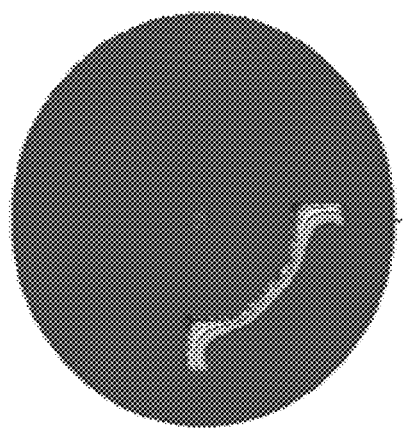
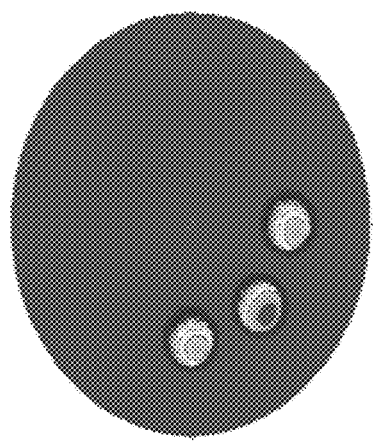
FIG. 9a    FIG. 9b
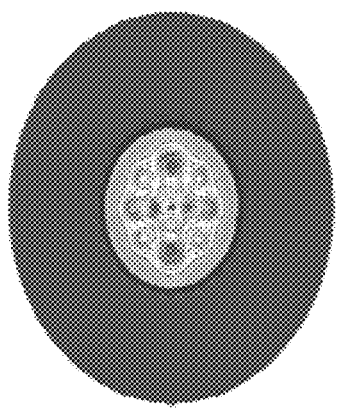
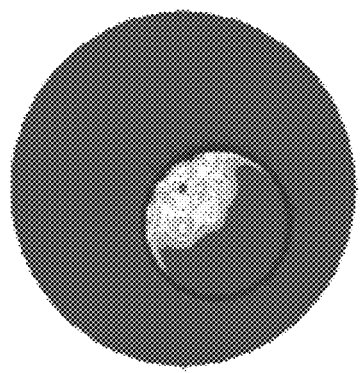
FIG. 9c    FIG. 9d

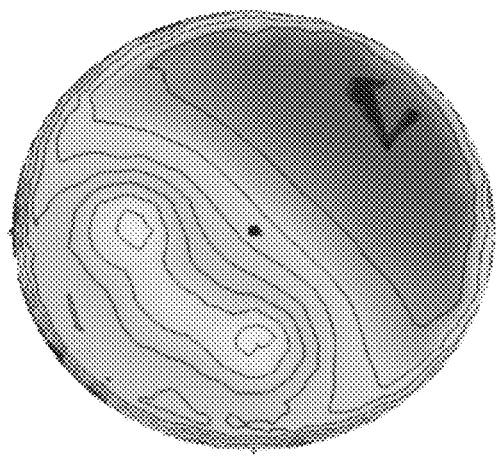
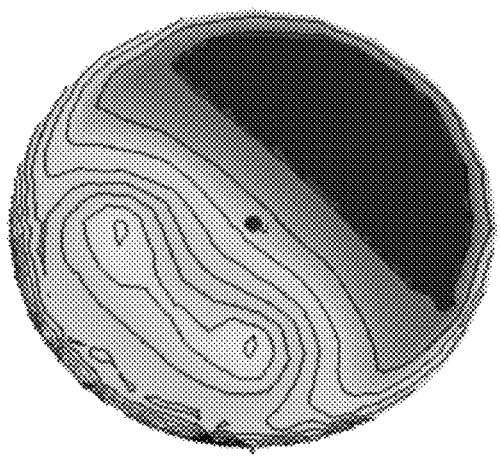
FIG. 10a            FIG. 10b
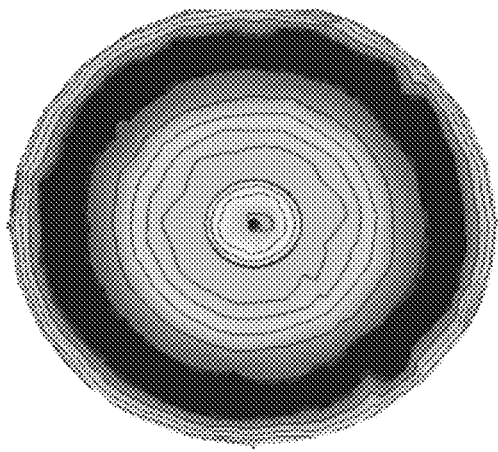
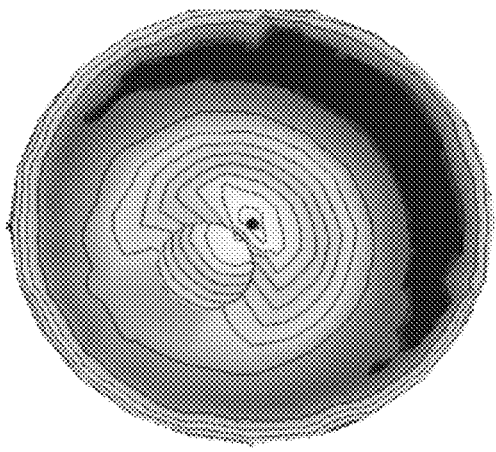
FIG. 10c            FIG. 10d

US 8,298,929 B2

OFFSET SOLDER VIAS, METHODS OF MANUFACTURING AND DESIGN STRUCTURES

FIELD OF THE INVENTION

The invention relates to semiconductor structures and methods of manufacture and, more particularly, to offset solder vias, methods of manufacture and design structures.

BACKGROUND

Solder bumps are commonly used as an electrical connection between semiconductor chips and ceramic or organic substrates used to connect to the outside world. There are a variety of processes that can be used to connect the solder bump to the chip. In one such method, the finished chip is coated with one or more layers of protective insulator that protects the last level of metallization from mechanical handling damage and corrosion or oxidation. In order to connect the solder to the last metallization layer, a hole or "via" is formed in the protective insulation, and another conductive layer (under bump metallurgy) is deposited both into the via and over a region surrounding the via. The shape of the via is usually circular, and is centered with respect to the position of the solder bump. The last conductive layer has a dual purpose: 1) adhesion to the protective insulating layer, and 2) formation of a good metallurgical bond with the solder.

Once the solder bumps are deposited onto the chip, the chip is then joined to the substrate by positioning the chip so that the solder bumps are aligned with the appropriate pads on the substrate, then heated in a furnace to above the melting point of the solder. Since the substrate has a much larger thermal expansion coefficient than the chip, the substrate shrinks much more than the chip during cooling to room temperature, causing shear stresses to develop on the solidified solder bumps. Because the relative displacement between the surface of the substrate and that of the chip is greater farther from the geographical center of the chip, the outermost solder bumps experience the largest shear stresses.

The shear stresses exert a rotating moment on the solder bumps that is perpendicular to the radial direction from the chip geographic center and the solder bump. The moment causes tensile stress to be concentrated at the outer edge of the solder bump where it comes into contact with the chip, and this tensile stress acts to pull the solder away from the surface of the chip. When the last insulating layer on the chip is more compliant than the hard dielectrics that form the wiring insulation, it can flex slightly. For this reason, under repeated thermal cycles, or even during cool down from chip joining, the tensile stress is transferred from the interface between the last conductive layer and the softer dielectric inward to the edge of the via. When the tensile stress is great enough, or the number of thermal cycles is large enough, the solder bump can crack and cause the electrical connection to fail.

One way to alleviate the magnitude of the tensile stress at the edge of the via is to move the via edge farther away from the perimeter of the solder bump, either by decreasing the diameter of the via or increasing the diameter of the solder bump. However, increasing the diameter of the solder bump places restrictions on the bump placement, which directly competes with the drive to shrink the chip footprint. Decreasing the diameter of the via, on the other hand, begins to affect the current carrying ability of the joint, leading to earlier failure by solder bump electromigration. Thus, there are constraints on both the diameter of the via and that of the solder bump.

Accordingly, there exists a need in the art to overcome the deficiencies and limitations described hereinabove.

SUMMARY

In a first aspect of the invention, a structure comprises at least one offset crescent shaped solder via formed in contact with an underlying metal pad of a chip. The at least one offset crescent shaped via is offset with respect to at least one of the underlying metal pad and an underlying metal layer in direct electrical contact with an interconnect of the chip which is in electrical contact with the underlying metal layer.

In another aspect of the invention, a structure comprises a plurality of discontinuous multiple vias arranged in an arc shape and formed within at least a portion of a bond pad. The plurality of discontinuous multiple vias are formed on a chip and are offset from an underlying metal layer of the chip. An apex of each of the plurality of discontinuous multiple vias are radially aligned with a geometric center of the chip such that their apexes point to the geometric center of the chip regardless of a location of each of the plurality of discontinuous multiple vias on the chip.

In yet another aspect of the invention, a method comprises forming an integrated circuit comprising an underlying metal layer in contact with an interconnect. The method further comprises forming a crescent shaped via offset from the underlying metal layer and a metal layer in direct electrical contact with the underlying metal layer. The apex of the crescent shaped via is formed to be radially in alignment of a geometric center of the chip. The method further comprises forming a solder bump in the crescent shaped via, such that the crescent shaped via offset moves an outer edge of the crescent shaped via farther from an outer edge of a solder bump without moving an inner edge much closer to an inner edge of the solder bump.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of the offset via (s), which comprises the structures of the present invention. In still further embodiments, a method in a computer-aided design system is provided for generating a functional design model of the offset via(s). The method comprises generating a functional representation of the structural elements of the offset via(s).

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 9a-9d show electromigration modeling at the under-bump metallurgy for vias discussed in accordance with aspects of the present invention;

FIGS. 10a-10d show electromigration modeling at the intermetallic interface for vias discussed in accordance with aspects of the present invention.

DETAILED DESCRIPTION

The invention relates to semiconductor structures and methods of manufacture and, more particularly, to offset solder vias, methods of manufacture and design structures. More specifically, the present invention is directed to solder vias that are offset from the underlying copper wiring layer, which are configured and/or structured to alleviate the magnitude of the tensile stresses imposed on the chip by having its edge farther away from a perimeter of the chip and/or solder bump. In embodiments, the solder vias can be a single via or a plurality of vias formed within a perimeter of a bond pad, or located entirely within a portion of the bond pad which undergoes a compressive stress (e.g., within a portion of the bond pad that is located closer to a geometric center of a chip (e.g. silicon die)). Advantageously, by using the different configurations of the offset solder vias, electromigration concern is minimized at the same time that the tensile stresses at the outboard edge of the via is minimized or decreased.

In embodiments, the offset via can be, for example, a single via with a crescent or arc shape structure. The crescent or arc shaped via is oriented with its apex towards a geometric chip center to reduce any stresses on the chip. Similar to a crescent or arc shaped via, the offset via can be a plurality of offset vias positioned around an arc of an imaginary circle, where an apex formed by the plurality of vias is oriented towards a geometric chip center to reduce any stresses on the chip. In embodiments, the plurality of vias can be positioned anywhere within a 180° angle on the arc, perpendicular to the chip center. The radius of the crescent (or the plurality of vias about an arc of the imaginary circle) can be as large as a conventional circular via, which keeps the current density at the leading edge of the crescent (or the plurality of vias) near the maximum value for the conventional circular via.

Figure 1:
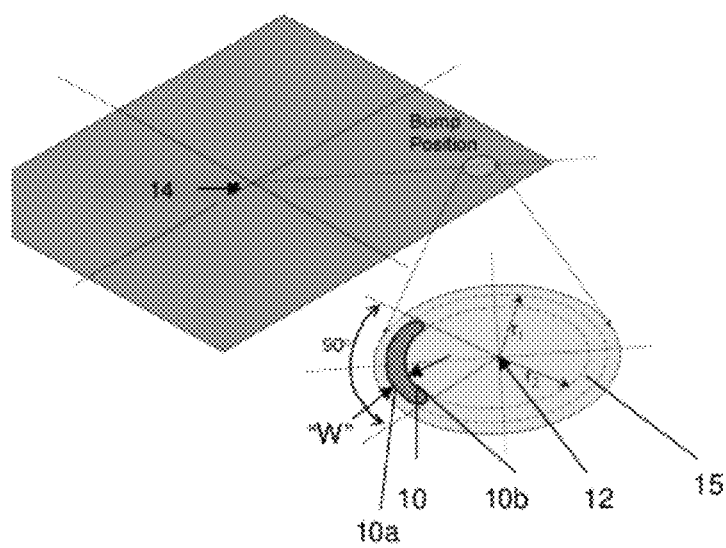
FIG. 1 shows an offset via in accordance with aspects of the present invention.
Figure 2:
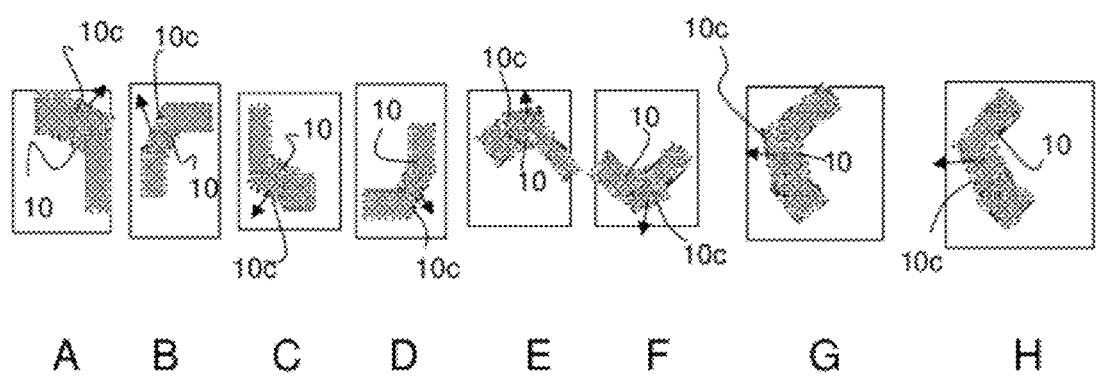
FIGS. 2A-2H show different orientations of the offset via in accordance with aspects of the present invention.

FIG. 1 shows an offset via in accordance with aspects of the present invention. More specifically, the offset via 10 is a crescent or arc shaped via (hereinafter referred to generally as a "crescent" shaped via) that is offset from an underlying metal layer such as copper wiring of an integrated circuit (shown in FIG. 4). In embodiments, the crescent shaped via 10 can overlap with the underlying copper wire, or can be remote from the underlying copper wire. (See, e.g., FIG. 4.) In either of these configurations, the solder connection can be made, for example, through the bond pad located within the crescent shaped via 10 connecting directly to an underlying Al layer which, in turn, makes electrical contact to the underlying copper layer.

In embodiments, the crescent shaped via 10 can be formed in a dielectric layer (on top of an aluminum layer), and can comprise concentric arcs connected together or other shapes that result in a crescent shape. For example, a design of the crescent can include two concentric circular arcs that subtend greater than +/−5° and less than or equal to +/−90° to either side of the radius between a bump center 12 and geometric chip center 14. In embodiments, the outer radius (r1) is within both the footprint of an underlying bond pad or Al layer (shown in FIG. 4) and that of the solder bump generally represented at reference numeral 60 of FIG. 4. In embodiments, the inner radius (r2) of the crescent shaped via 10 is smaller than the outer radius (r1), where the outer radius (r1) can be up to the size of the underlying bond pad. In embodiments, the ends of the two arcs are joined by a circular arc of 180° whose diameter is equal to the difference between the outer (r1) and inner (r2) arc radii. The size of the offset via 10 for any particular application should be determined based on the balance of two considerations, e.g., CPI (Chip-Package Interaction) stress and EM (Electromigration) stress, for a particular application or technology.

A benefit can be obtained from offsetting the via 10 and from reducing the size, independently. For example, a typical offset "final" via would range from 5 um to about 30 um in size, with a lower limit determined by film thickness of the final passivation film in which the via is being created. Also, the angle of the crescent shape can range from about 0° to 90° internal angle, so that the range goes from a offset rectangle to a block-C-shaped via. The radius/offset between the center of the solder bump and the center of the via can be bounded by 0 (not offset) and the size of the underlying pad on which the via lands on that is electrically connected to the chip (e.g., the aluminum pad). Note, the underlying pad is assumed to be smaller than the solder bump; however, if this is not the case, then the upper bound would be the edge of the solder bump. In current designs, the offset has been between, as a non-limiting example, of about 15 um and 30 um; although other dimensions are also contemplated by the present invention. The most benefit is found the further away the via is from a center of the solder bump, but there is still an incremental improvement with a lesser offset.

In embodiments, additional shapes can be used to form the crescent shaped via 10. For example, the crescent shape of the crescent shaped via 10 can be composed of a plurality of straight segments connected at their ends. In such an embodiment, the arcs are approximated by 90° sections of regular polygons and the ends are joined by straight lines connecting the two approximate arcs by an angle of about 0-90°, which can be a difference between a straight line offset, to a block "C" shape. In embodiments, the width "w" of the crescent shaped vias 10 can be about 5 μm to about 25 μm and more specifically about 15 μm; although other dimensions are also contemplated by the present invention.

In any of these embodiments, the shape of the crescent shaped via 10 moves the outboard edge 10a of the via(s) farther from the outboard edge of the solder bump without moving the inboard edge 10b closer to the inboard edge of the solder bump. Also, the crescent shaped via 10 can be located within a compressive portion of the bond pad (shown in FIG. 4), which provides improved white bump mitigation. For example, the crescent shaped via 10 reduces current density in comparison to certain via structures, which, in turn, decreases the likelihood of void formation. Also, the configuration of the crescent shaped via 10 reduces overall stress placed on the chip, thus minimizing delamination of an underlying dielectric layer.

FIGS. 2A-2H show different orientations (locations) of the crescent shaped via 10 in accordance with aspects of the present invention. More specifically, FIGS. 2A-2H show different locations of the crescent shaped via 10 with the apex 10c pointing towards a geometric center of the chip. For example, as shown in FIGS. 2A-2H, the apex 10c of the crescent shaped via 10 can be pointed towards different directions, depending on the location of the crescent shaped via 10 and the geometric chip center. In these representations, the apex 10c is shown to be in eight different directions, all of which point towards a geometric center of the chip. In a more granular representation, the apex 10c can be provided in more directions, depending on the location of the crescent shaped via 10 with respect to the geometric chip center. In FIGS. 2A-2H, the geometric center of the chip 20 is graphically represented by the arrow, in each of the representations.

Figure 3:
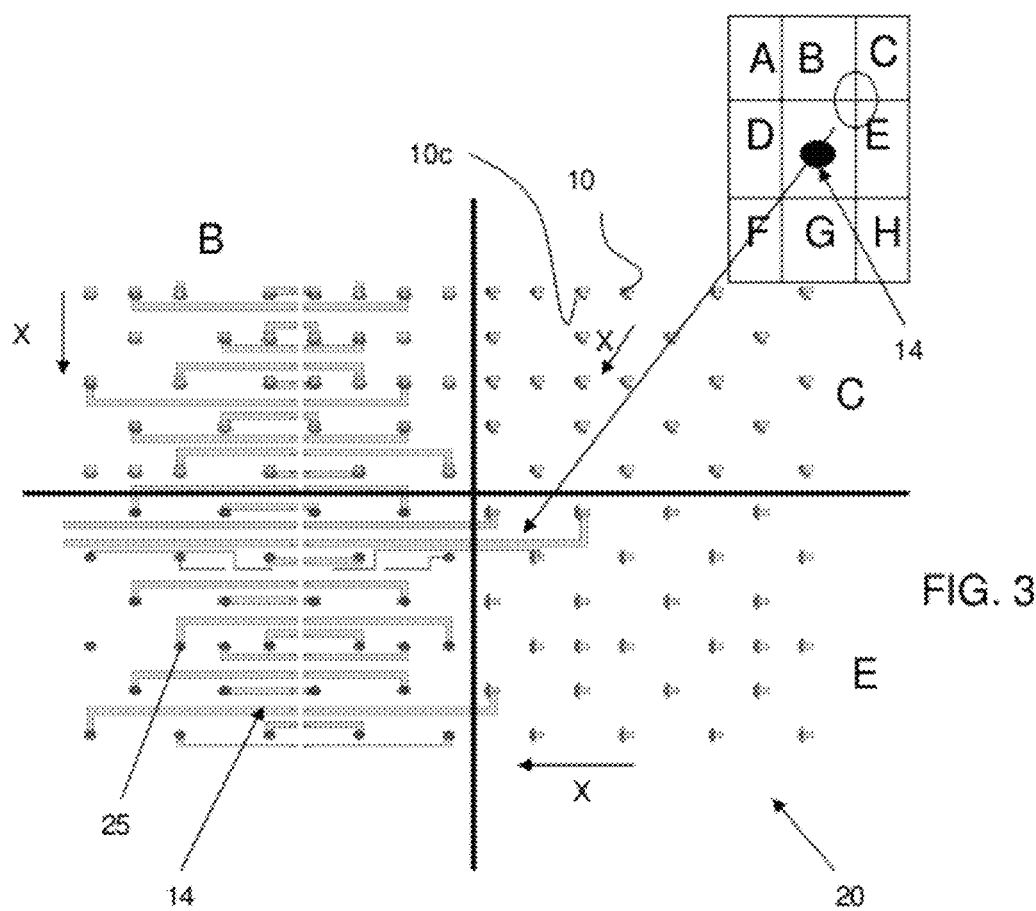
FIG. 3 shows an exploded view of a chip and locations of the offset via in accordance with aspects of the present invention.

FIG. 3 shows an exploded view of a chip and respective crescent shaped vias 10 in accordance with aspects of the present invention. More specifically, FIG. 3 shows a plurality of crescent shaped vias 10, in different sectors A-H of the chip 20. In the exploded view, the plurality of crescent shaped vias 10 is in sectors B, C and E (and the geometric center 14). In embodiments, in each sector, the crescent shaped vias 10 (e.g., apex 10c) will point in the same direction towards the geometric center 14 of the chip 20, as depicted by arrow "x". In this way, the crescent shaped vias 10 (e.g., apex 10c) in, for example, sector B and C will be in a different orientation that the each of the crescent shaped vias 10 (e.g., apex 10c) in sector E. Accordingly, the apex of each offset crescent shaped solder via 10 point to the geometric center of the chip regardless of the location of the vias on the chip, e.g., an apex of each of the offset crescent shaped solder vias 10 is radially aligned with a geometric center of a chip. In embodiments, the vias 25 in the geometric center 14 of the chip 20 can be conventional vias.

Figure 4:
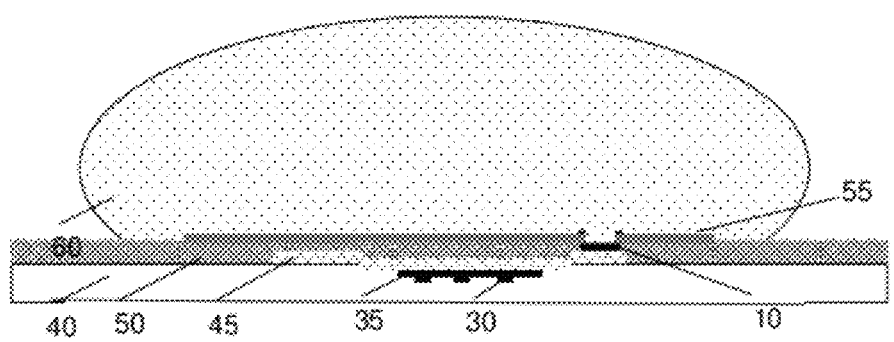
FIG. 4 shows a cross-sectional view of an integrated circuit implementing the offset via in accordance with aspects of the present invention.

FIG. 4 shows a cross-sectional view of an integrated circuit implementing the offset via in accordance with aspects of the present invention. As should be understood by those of skill in the art, the integrated circuit implementing the offset vias can be fabricated using conventional CMOS technologies such as, for example, deposition (e.g., chemical vapor deposition (CVD), lithographic and etching (reactive ion etching (RIE)) steps to form patterns, etc.

In FIG. 4, the integrated circuit includes an interconnect structure 30 electrically connected to a copper wiring layer 35, formed in a dielectric layer 40. The interconnect structure is formed by lithographic, etching and deposition processes. Aluminum (Al) layer 45 is formed in another dielectric layer 50, which makes direct electrical contact to the copper wiring layer 35. Lithographic, etching and deposition processes form the aluminum (Al) layer (pad) 45. A bonding pad 55 is in the offset via 10, formed in a dielectric layer 50 (which can represent multiple layers). The bonding pad (also known as under bump metallurgy (UBM)) 50 is in direct electrical contact with the Al layer 45. The bonding pad 55 can comprise several layers of metals, which provides a pad metallurgy that protects the integrated circuit chip, while making good mechanical and electrical contact (connection) between the solder bump 60 and the underlying Al pad 45. In embodiments, the bonding pad 55 can be any under bump metallurgy known to those of skill in the art.

The solder bump 60 is formed in the offset via 10, in contact with the bonding pad 55. The offset via 10 can be formed using conventional lithographic and etching processes to form the pattern. The solder bump can be formed using conventional solder bump plating processes, for example. The offset via 10 is offset from the copper wiring layer 35 and, in embodiments, from the underlying Al layer 45. For example, in embodiments, the offset via 10 can overlap with the copper wiring layer 35 or be remote from the copper wiring layer 35. In further embodiments, the offset via 10 can be formed within a perimeter of the bond pad 55 or located entirely within a portion of the bond pad 55, which undergoes a compressive stress.

Figure 5:
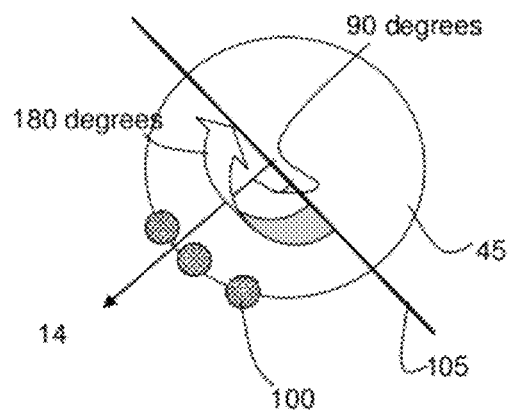
FIG. 5 shows a plurality of offset vias in accordance with additional aspects of the present invention.
Figure 6:
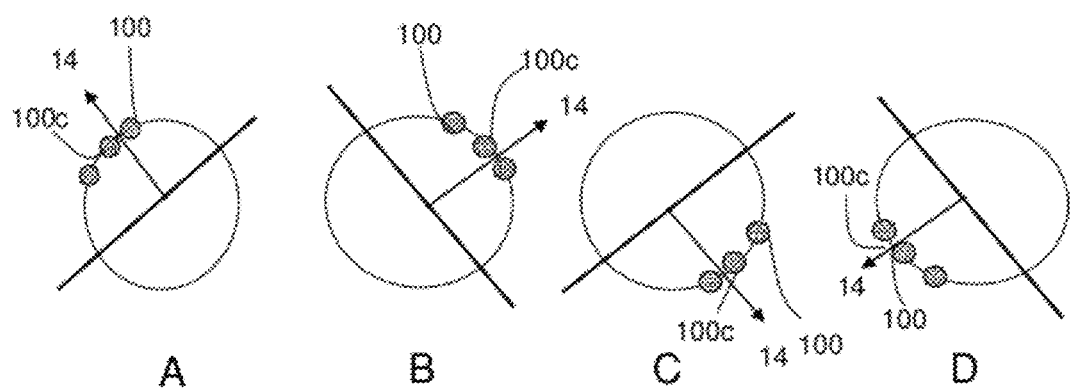
FIGS. 6A-6D show different orientations of the offset vias in accordance with aspects of the present invention.

FIG. 5 shows a plurality of offset vias in accordance with additional aspects of the present invention. As shown in FIG. 5, the offset vias can be a plurality of offset vias 100 having a circular shape. Those of skill in the art will understand that other shapes of the offset vias 100 are also contemplated by the present invention such as, for example, oval, pentagon, octagonal, etc. In embodiments, the offset vias 100 can have a diameter or cross-section of about 5 µm to about 25 µm and more specifically about 5 µm to about 10 µm and even more specifically about 6 µm; although other dimensions are also contemplated by the present invention.

Although FIG. 5 shows three offset vias 100 provided about an arc section of an imaginary circumference of a circle, the present invention also contemplates two or more vias 100. In embodiments, the offset vias 100 can be provided within a circular arc of 180°, as depicted by the imaginary line 105, which is perpendicular to a geometric center 14 of the chip. In embodiments, the design of the offset vias 100 can have a radius between a bump center 12 and geometric chip center 14, where the outer radius is within both the footprint of an underlying Al pad and that of the solder bump. Also, the offset vias 100 can be located within a compressive portion of the bond pad (shown in FIG. 4).

In embodiments, the offset vias 100 move the outboard edge of the via(s) farther from the outboard edge of the solder bump and/or chip perimeter without moving the inboard edge 10b closer to the inboard edge of the solder bump. In embodiments, the offset vias 100 provide improved white bump mitigation compared to conventional solder bump configurations. For example, in embodiments, the offset vias 100 reduces current density, which, in turn, decreases the likelihood of void formation. Also, the configuration of the offset vias 100 reduces overall stress placed on the chip, thus minimizing delamination of an underlying dielectric layer. This is because the multiple vias 100 have the advantage that they can still remain far enough from the edge of the bump to have a relatively large process window and to reduce the tensile stress at the outboard edge of the via.

In embodiments, the single crescent shaped via 10 can comprise the three smaller vias 100, but that was no wider than they were and subtended approximately the same arc of the solder bump circumference. In embodiments, the single crescent shaped via 10 is a contiguous structure and has about twice the area of the three individual vias 100, and a leading edge length that is greater than either that of the single via or the sum of the edge lengths of the three smaller vias 100. This can provide improved current density distribution and electromigration mitigation.

FIGS. 6A-6D show different orientations of the offset vias 100 in accordance with aspects of the present invention. As shown in FIGS. 6A-6D, show different locations of the offset vias 100 with the apex 100c pointing towards a geometric center of the chip, in order to reduce stresses. For example, as shown in FIGS. 6A-6D, the apex 100c of the vias 100 can be pointed towards different directions, depending on the location of the vias 100 and the geometric chip center. In these representations, the apex 100c is shown to be in four different directions, all of which point towards a geometric chip center. In a more granular representation, the apex 100c can be provided in more directions, depending on the location of the via 100 with respect to the geometric chip center. In FIGS. 6A-6D, the geometric center of the chip represented by the arrow, in each of the representations.

Figure 7:
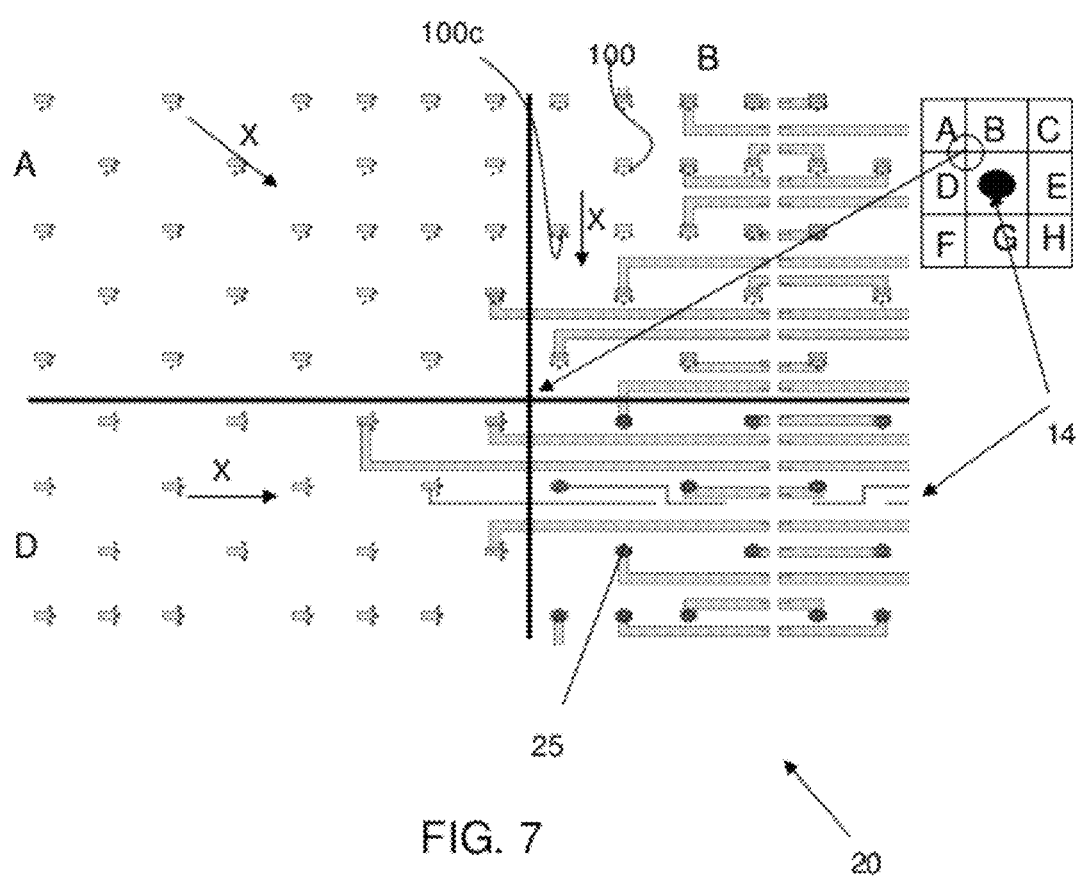
FIG. 7 shows an exploded view of a chip location of the offset via in accordance with aspects of the present invention.

FIG. 7 shows an exploded view of a chip in accordance with aspects of the present invention. More specifically, FIG. 7 shows a plurality offset vias 100, in different sectors A-H of the chip 20. In the exploded view, the plurality of vias 100 are shown to be in sectors A, B and D (and the geometric center 14). In embodiments, in each sector, the vias 100 (e.g., apex 100c) will point in the same direction towards the geometric center 14 of the chip 20, as depicted by arrow "x". In this way, the vias 100 (e.g., apex 10c) in, for example, sector A and B will be in a different orientation that each of the vias 100 (e.g., apex 100c) in sector D. Accordingly, the apex of each offset via 100 point to the geometric center of the chip regardless of the location of the vias on the chip, e.g., an apex of the arrangement of vias 100 is radially aligned with a geometric center of a chip. In embodiments, the vias 25 in the geometric center 14 of the chip 20 can be conventional vias.

TABLE 1 shows the vertical current in mA/μm$^2$ at different levels in the chip for a crescent shaped via, three offset vias (each of 10 μm), a single offset via and a conventional centered via. As shown in FIG. 1, the crescent shaped via and the three offset vias provides a lower current density at the critical IMC level than that of a single offset via. Due to offsetting the via on the Al layer, the lateral current density in the Al can introduce a new electromigration problem. Aluminum is known to be more sensitive to lateral current density in higher current applications, therefore it must be measured and accounted for. Even though the current density in the Al level increases significantly in the crescent shaped via and three offset vias configuration, this is not seen to be detrimental to the functioning of the circuit solder connection, as the current density levels at which Al electromigrates is well below the modeled values. However, the configuration of the offset vias of the present invention has been found to reduce overall stress placed on the chip, thus minimizing delamination of an underlying dielectric layer.

TABLE 1

| | Single crescent shaped via | Three 10 um offset vias | Single offset via | Conventional Centered single via |
|---|---|---|---|---|
| Last Metal layer (e.g., copper layer) | 11 | 11 | 8.3 | 8.5 |
| Al | 8.0 | 7.9 | 2.9 | 2.7 |
| Under Ball Metallurgy | 2.8 | 2.5 | 1.2 | 0.58 |
| Inter Metal Compounds (IMC), e.g., copper tin mixture | 0.079 | 0.079 | 0.084 | 0.076 |

Figure 8A:
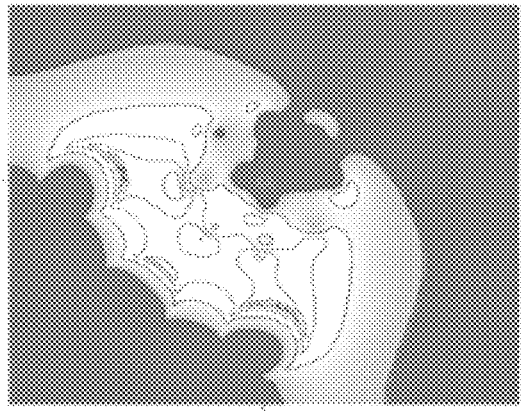
FIGS. 8a-8d show electromigration modeling at an Al level for vias discussed in accordance with aspects of the present invention.
Figure 8B:
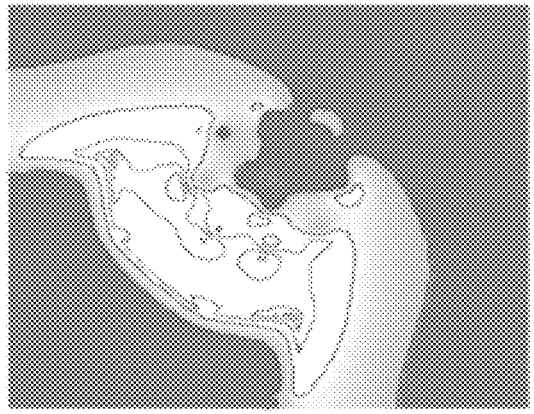
Figure 8C:
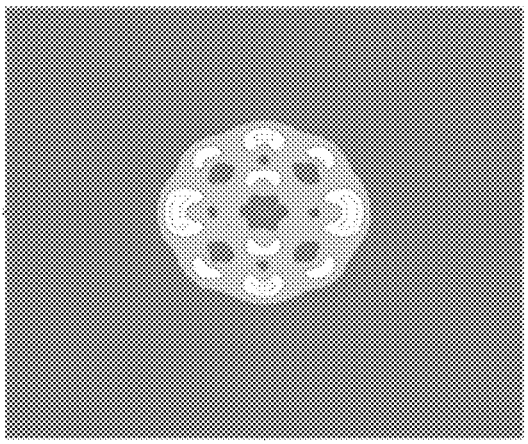
Figure 8D:
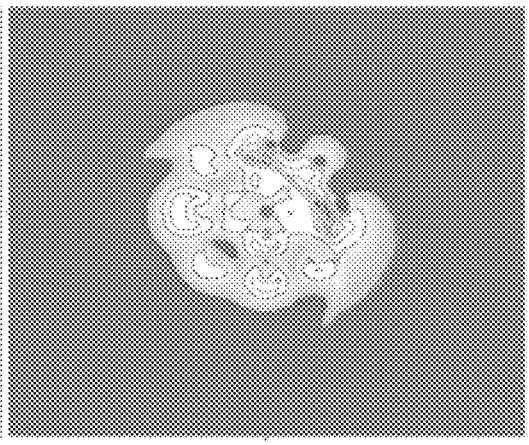

FIGS. 8a-8d show electromigration modeling at the Al level for the vias discussed in Table 1. More specifically, FIG. 8a represents a model of the crescent shaped via, FIG. 8b represents a model of the multiple offset vias, FIG. 8c represents a model of a conventional single centered via and FIG. 8d represents a model of a single offset via. As shown, the crescent shaped via (FIG. 8a) has more evenly distributed current density, which is ideal for the elimination of voiding, than that of the remaining models shown in FIGS. 8b and 8d.

The offset vias (FIG. 8b) also has a more evenly distributed current density than that of the single offset via (FIG. 8d).

FIGS. 9a-9d show electromigration modeling at the under-bump metallurgy for the vias discussed in Table 1. More specifically, FIG. 9a represents a model of the crescent shaped via, FIG. 9b represents a model of the multiple offset vias, FIG. 9c represents a model of a conventional single centered via and FIG. 9d represents a model of a single offset via. As shown, the crescent shaped via (FIG. 9a) has more evenly distributed current density, which is ideal for the elimination of voiding, than that of the remaining models shown in FIGS. 9b and 9d. The offset vias (FIG. 9b) also have a more evenly distributed current density than that of the single offset via (FIG. 9d).

FIGS. 10a-10d show electromigration modeling at the intermetallic interface for the vias discussed in Table 1. More specifically, FIG. 10a represents a model of the crescent shaped via, FIG. 10b represents a model of the multiple offset vias, FIG. 10c represents a model of a conventional single centered via and FIG. 10d represents a model of a single offset via. As shown, the crescent shaped via (FIG. 10a) has more evenly distributed current density, which is ideal for the elimination of voiding, than that of the remaining models shown in FIGS. 10b and 10d. The offset vias (FIG. 10b) also have a more evenly distributed current density than that of the single offset via (FIG. 10d).

Figure 11:
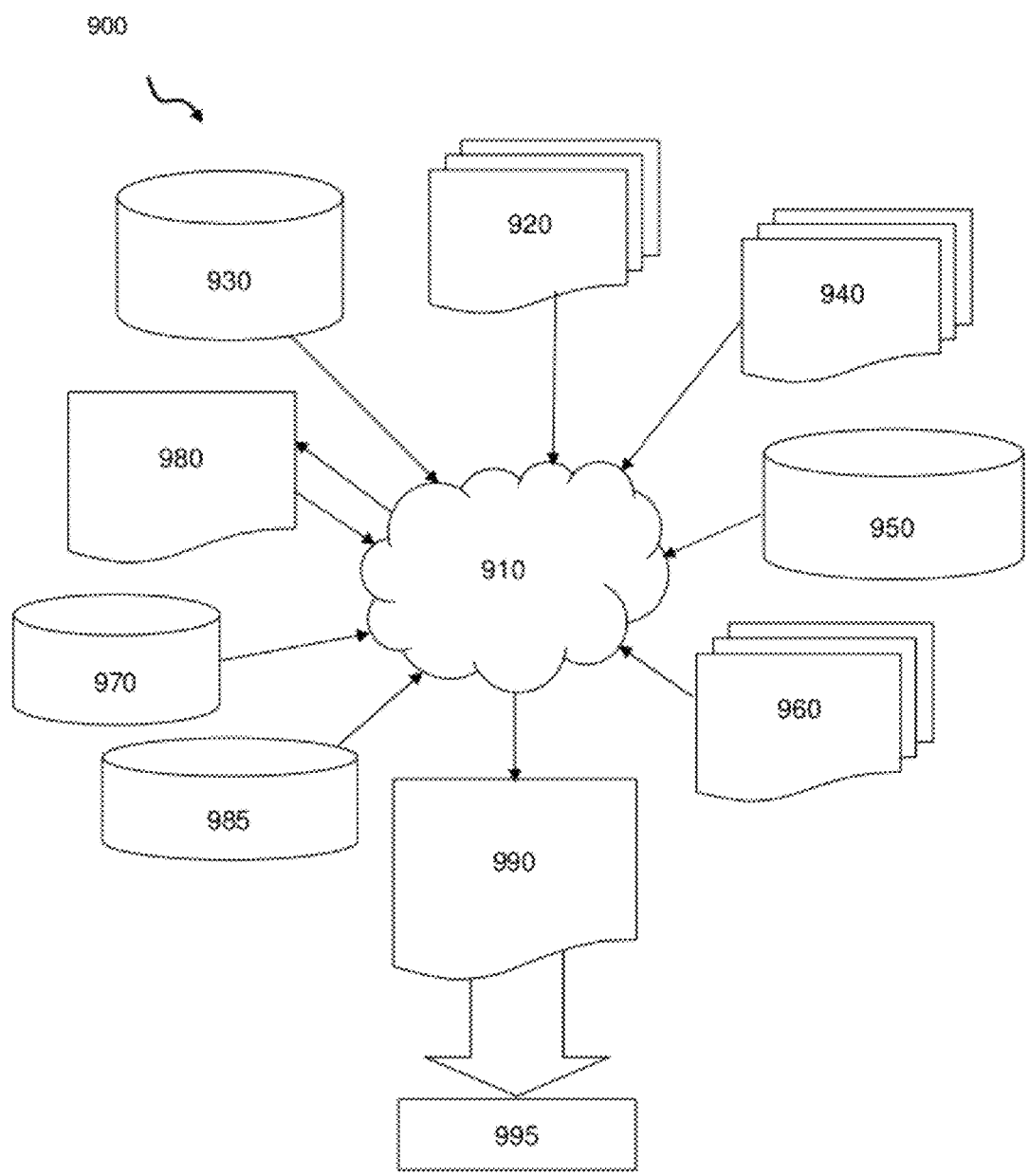
FIG. 11 is a flow diagram of a design process used in semiconductor design, manufacture, and/or test.

FIG. 11 is a flow diagram of a design process used in semiconductor design, manufacture, and/or test. FIG. 11 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1, 2A-2H, 3-5, 6A-6D, 7 and 8. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 920 that is preferably processed by a design process 910. Design structure 920 may be a logical simulation design structure generated and processed by design process 910 to produce a logically equivalent functional representation of a hardware device. Design structure

920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1, 2A-2H, 3-5, 6A-6D, 7 and 8. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1, 2A-2H, 3-5, 6A-6D, 7 and 8 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures) Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1, 2A-2H, 3-5, 6A-6D, 7 and 8. In one embodiment, design structure 990 may comprise a compiled, executable HDL simulation model that functionally simulates the devices shown in FIGS. 1, 2A-2H, 3-5, 6A-6D, 7 and 8.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1, 2A-2H, 3-5, 6A-6D, 7 and 8. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method, comprising:
   forming an integrated circuit comprising an underlying metal layer in contact with an interconnect;
   forming a crescent shaped via offset from the underlying metal layer and a metal layer in direct electrical contact with the underlying metal layer, wherein an apex of the crescent shaped via is formed to be radially in alignment of a geometric center of the chip; and
   forming a solder bump in the crescent shaped via, such that the crescent shaped via offset moves its outboard edge farther from an outboard edge of a solder bump without moving an inboard edge much closer to an inboard edge of the solder bump.

2. The method of claim 1, wherein the crescent shaped via is formed within a perimeter of a bond pad of the chip.

3. The method of claim 2, wherein the crescent shaped via is formed entirely within a portion of the bond pad of the chip.

4. The method of claim 1, wherein the crescent shaped via is formed within a portion of a bond pad of the chip, such that the crescent shaped via is located closer to a geometric center of the chip than a perimeter of the chip.

5. The method of claim 1, wherein the apex of the crescent shaped via points to the geometric center of the chip regardless of a location of the crescent shaped via on the chip.

6. The method of claim 1, wherein the crescent shaped via is formed from two concentric circular arcs that subtend greater than +/−5 degrees and less than +/−90 degrees to either side of a radius between a bump center and a center of the chip.

* * * * *